United States Patent

[11] 3,574,446

| [72] | Inventor | Willis D. Moore<br>P.O. Box 392, Athens, Tex. 15751 |
|---|---|---|
| [21] | Appl. No. | 769,487 |
| [22] | Filed | Oct. 22, 1968 |
| [45] | Patented | Apr. 13, 1971 |

[54] ADJUSTABLE REAR VIEW MIRROR WITH ANTIGLARE STRUCTURE
14 Claims, 5 Drawing Figs.

[52] U.S. Cl. .................................................. 350/283
[51] Int. Cl. ...................................................... G02b 5/08, G02b 7/18
[50] Field of Search........................................... 350/276, 277, 278, 279, 281, 283, 289

[56] References Cited
UNITED STATES PATENTS

| 1,885,594 | 11/1932 | Drury | 296/97.13UX |
| 2,806,408 | 9/1957 | Moeller | 350/289X |
| 3,008,375 | 11/1961 | Henderson | 350/289 |
| 3,199,075 | 8/1965 | Simmons | 350/289UX |
| 3,337,286 | 8/1967 | Wieszeck | 350/283 |

FOREIGN PATENTS

| 708,776 | 7/1931 | France | 350/289 |

Primary Examiner—John K. Corbin
Attorney—Richards, Harris and Hubbard

ABSTRACT: A vehicle mirror assembly assembly having daytime and nighttime positions which are variable in response to operation of the directional signal lever of the vehicle. A support is provided for attachment to the vehicle, with a mirror and an antiglare member mounted within the support upon spaced vertical axes. A first solenoid has a solenoid shaft connected to the mirror and is operable in response to the directional signal lever of the vehicle in order to move the mirror between two extreme positions. The second solenoid has a solenoid shaft connected to the antiglare member and is responsive to the directional signal lever and the vehicle light switch for moving the antiglare member between two extreme positions. Switch structure is provided to prevent the first solenoid from being actuated when the second solenoid is actuated.

PATENTED APR 13 1971 3,574,446

INVENTOR
WILLIS D. MOORE

Richards, Harris & Hubbard

ATTORNEY

PATENTED APR 13 1971

INVENTOR
WILLIS D. MOORE

Richards, Harris & Hubbard
ATTORNEY 3,574,446

1

ADJUSTABLE REAR VIEW MIRROR WITH ANTIGLARE STRUCTURE

FIELD OF THE INVENTION

This invention relates to vehicle mirror assemblies, and more particularly to automatically controlled mirrors of the nonglare type for use on automobiles and the like.

THE PRIOR ART

It has been heretofore found that the occurrence of collisions between automobiles may be reduced by providing a rear view automobile mirror which automatically changes the field of vision of the driver during turning movements of the automobile. Examples of such mirrors are disclosed in a number of patents, among those being U.S. Pat. No. 2,906,098, issued to E. L. Mayo on Sept. 20, 1959; U.S. Pat. No. 2,906,099, issued to A. G. Getz on Sept. 29, 1949; and U.S. Pat. No. 3,008,375, issued to C. P. Henderson on Nov. 14, 1961.

Additionally, automobile mirrors have been heretofore developed which automatically vary the position of an antiglare member on the mirror in order to eliminate direct headlight glare from the driver's vision during nighttime driving. Examples of patents illustrating such systems are U.S. Pat. No. 3,206,771, issued to W. R. Knowlton et al. on Mar. 27, 1962; U.S. Pat. No. 3,059,539, issued to L. C. Meade on Oct. 23, 1962; and U.S. Pat. No. 3,152,216, issued to M. L. Woodward on Oct. 6, 1964. However, automobile mirror assemblies heretofore developed have not been completely satisfactory with respect to simplicity of construction and operation, and further have not heretofore provided the benefits of nonglare mirror operation in combination with a mirror automatically moveable upon turning of the automobile.

SUMMARY OF THE INVENTION

In accordance with the present invention, a mirror is mounted for movement about a first axis on a vehicle. A generally transparent antiglare member is mounted forward of the mirror for independent movement about a second axis. Mechanism is provided to move the mirror about the first axis between two extreme positions in dependence upon actuation of the directional signal lever of the vehicle. Structure is also provided for selectively moving the antiglare member between two extreme positions about the second axis in response to the actuation of the directional signal lever and the light switch of the vehicle.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
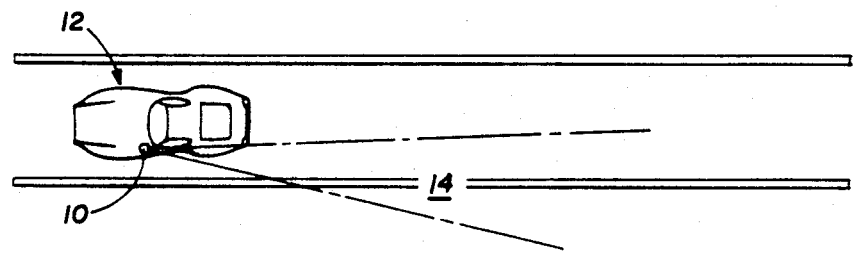
FIG. 1 illustrates the normal operation of the present mirror assembly.
Figure 2:
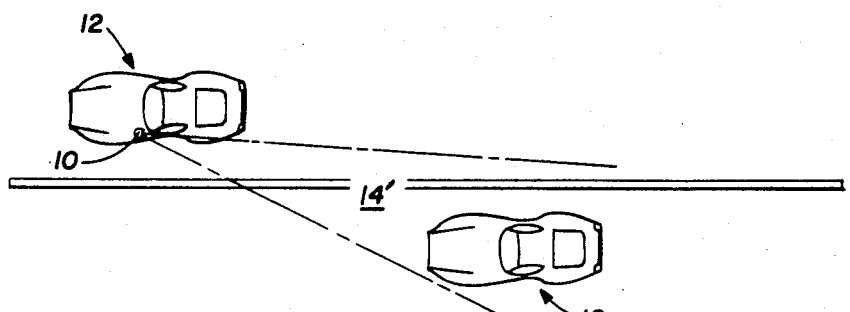
FIG. 2 illustrates how the field of vision provided by the present mirror assembly is changed when a left turn or change of driving lane to the left is contemplated by the vehicle driver.

FIG. 1 illustrates the present mirror assembly 10 located on the side of vehicle 12. When the vehicle 12 is driven along a relatively straight traverse, the mirror field of vision designated generally by the numeral 14 is directly behind the vehicle 12. However, when the driver of the vehicle 12 operates the left-hand directional signal lever to indicate an expected turn or change of driving lanes, the field of vision of the mirror assembly 10 is shifted to the position 14$^1$ shown in FIG. 2 in order to vary the rear vision of the vehicle operator toward the left. This shift of vision enables the vehicle operator to see other vehicles 16 which are in a position to interfere with the upcoming left turn or change of driving lanes to the left. As will later be described in detail, in nighttime conditions, an antiglare member also prevents the vehicle operator from being blinded by the headlights of rearwardly approaching cars while attempting to turn or change lanes.

While the mirror assembly 10 may be adjusted to move the operator's field of vision between a number of different extreme positions, it has been found that a displacement of about 20° of the field of vision is advantageous when making left turns or changing driving lanes to the left.

Figure 3:
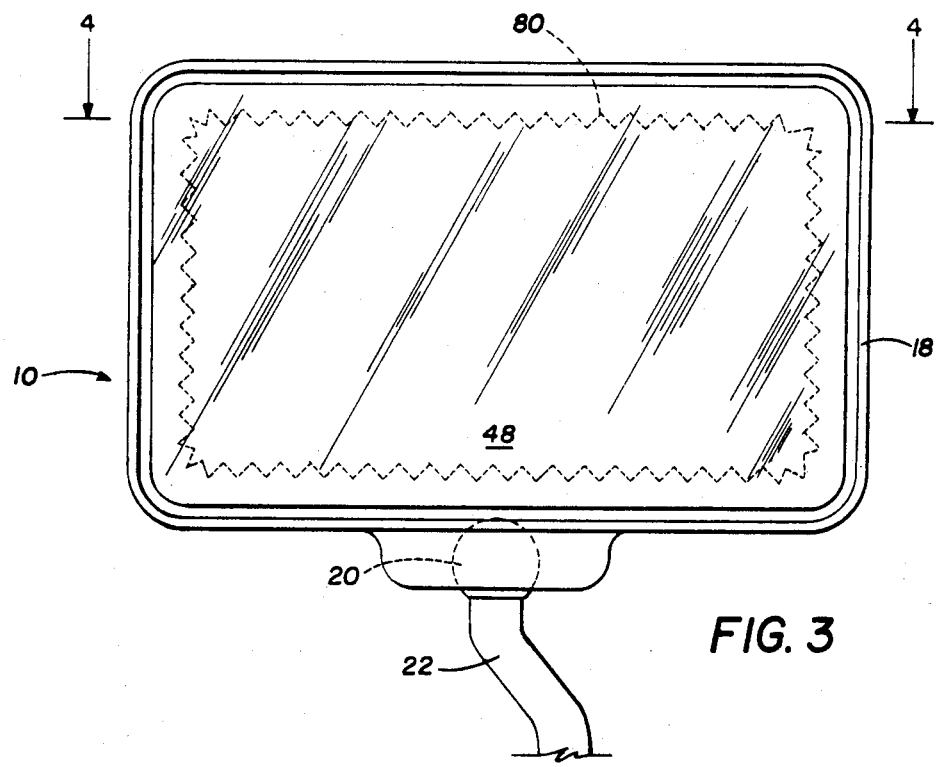
FIG. 3 is a front view of the present mirror assembly.

FIG. 3 illustrates the front of the mirror assembly 10. The mirror assembly is mounted in a support body 18 which is swivel mounted on a ball joint 20 attached to an extension member 22. Extension member 22 is directly connected to the side of an automobile. The position of the mirror assembly 10 may be manually adjusted due to the ball joint 20.

Figure 4:
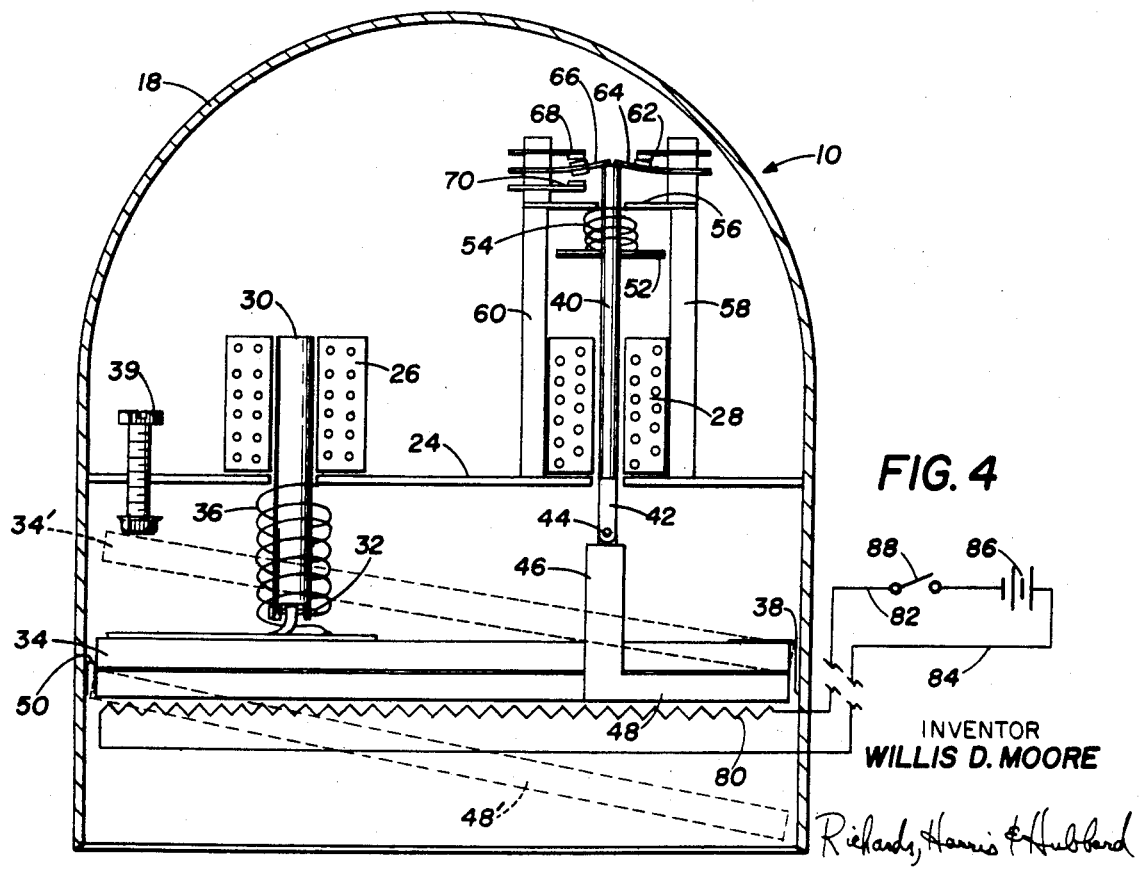
FIG. 4 is a cross-sectional view of the mirror assembly shown in FIG. 3 taken generally along the section lines 4—4.

FIG. 4 is a somewhat diagrammatic sectional view of the mirror assembly 10. A panel 24 extends through the support body 18 and supports first solenoid windings 26 and second solenoid windings 28. A solenoid shaft 30 extends forwardly from the winding 26 and is pivotally connected by a pin 32 to a mirror 34. A spring 36 is connected between the mirror 34 and the panel 24. The mirror 34 is connected for rotation about a vertical axis by a flexible hinge 38 attached at one end to the support body 18.

When the solenoid windings 26 are deenergized, the solenoid shaft 30 is at the illustrated forwardly extended position and the mirror 34 is maintained generally perpendicular to the line of travel of the vehicle. However, when the solenoid windings 26 are energized, the solenoid shaft 30 is retracted rearwardly, thus rotating the mirror 34 about the hinge 38 to the dotted line position 34'. A stop member 39 is threadedly received in the panel 24 to enable the extreme position of the mirror 34 to be varied by rotating the member 39. In the dotted line position 34' of the mirror, the spring 36 is compressed. Thus, when the solenoid windings 26 are deenergized, the spring 36 returns the mirror 34 to its normal position perpendicular to the line of travel of the vehicle.

The solenoid windings 28 include a solenoid shaft 40 disposed therethrough. The forward end of the shaft 40 includes an L-shaped extension 42 which is pivotally connected at a pivot axis 44 to a member 46. Extension 42 is L-shaped to avoid the mirror 34. Member 46 is connected to the top of an antiglare member 48. As shown in FIG. 3, the antiglare member 48 is generally rectangular in shape. Mirror 34 has a configuration similar to the antiglare member 48. Antiglare member 48 is hinged by a flexible hinge 50 at one end to the support body 18. The hinge connections 38 and 50 may comprise any suitable pivot mechanism, but preferably are constructed from bent strips of flexible metal such as phosphor bronze or the like. Alternatively, polyethylene plastic material may also be utilized to form flexible hinge strips. Hinges constructed from such flexible strips are inexpensive, frictionless, and require no lubrication.

The antiglare member 48 is generally transparent and is preferably coated to reduce glare. A uniform coating of silicon oxide has been found to be useful for coating the antiglare member 48, making it partially reflective.

The rearward end of the solenoid shaft 40 includes a support 52 attached to one end of a spring 54 which encircles the shaft 40. The rearward end of the spring 54 is connected to a platform 56 having an aperture therein to receive the rearward end of the shaft 40. The platform 56 is supported by posts 58 and 60. At the rearward end of the post 58 are connected a rigid electrical contact 62 and a flexible electrical contact 64. A flexible electrical contact 66 is disposed on the post 60 between two fixed electrical contacts 68 and 70. The electrical contacts 62—70 are connected to the electrical circuit shown in FIG. 5.

When the solenoid windings 28 are deenergized, the rearward end of the shaft 40 flexes the flexible contact 64 against the contact 62, and the flexible contact 66 against the contact 68. When the solenoid windings 28 are energized, the shaft 40 is moved forwardly to move the antiglare member 48 to the position of 48' illustrated by the dotted line thus causing reflection of a part of the incident light rays at an angle from the mirror. The forward movement of the shaft 40 opens the connections between contacts 62 and 64, and between contacts 66 and 68. The connection between contacts 66 and 70 is closed by the forward movement of the shaft 40.

Figure 5:
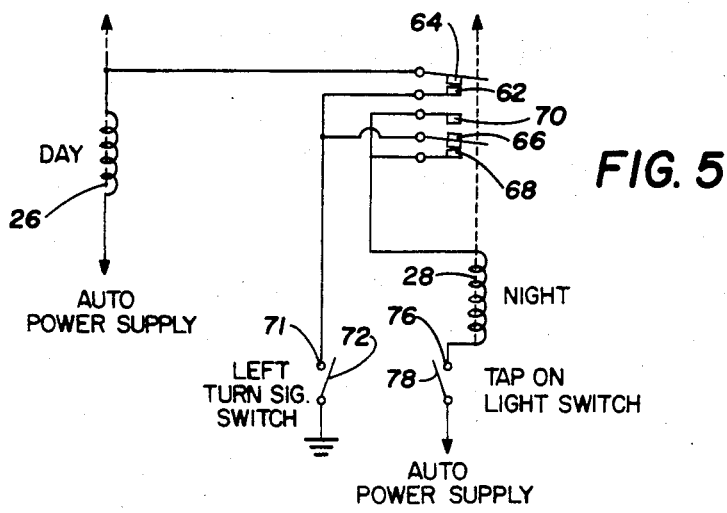
FIG. 5 is a schematic diagram of the circuit utilized to energize the solenoids shown in FIG. 4.

The operation of the mirror assembly shown in FIGS. 3 and 4 may be better understood by reference to FIG. 5. One terminal of the solenoid windings 26 is connected to the automobile power supply. The other terminal of the solenoid windings 26 is connected to the flexible contact 64 which is normally engaged with the fixed contact 62 in the manner shown in FIG. 4. Contact 62 is connected to a terminal 71. A grounded switch arm 72 is connected to the left turn signal lever (not shown) of the automobile. Thus, when the left turn signal lever of the automobile is engaged to indicate an upcoming left turn or change of driving lanes to the left, the switch 72 closes on contact 71.

The terminal 71 is also connected to the flexible contact 66 which is normally held in engagement with the contact 68. Contacts 68 and 70 are connected to a terminal of the solenoid windings 28. The other terminal of the solenoid windings 28 is connected to a terminal 76 which comprises a tap on the light switch (not shown) of the vehicle. A switch arm 78 is connected to the vehicle power supply and is moved by the actuation of the light switch to close on the terminal 76 when the light switch is turned on. In an alternative arrangement, a separate grounding switch actuated by the automobile light switch may be utilized in place of the utilization of the tap on the light switch. It will also be understood that power could alternatively be applied to the circuit via the moveable switch member 72, with the terminals of the solenoid windings 26 and 28 grounded.

A resistance heater element 80 is diagrammatically illustrated in FIGS. 3 and 4 as disposed around the inside of the support body 18. Electric leads 82 and 84 run from the element 80 to a source of electric power 86, which may be the automobile power supply. A switch 88 may be selectively operable to open or close the electrical circuit between the element 80 and the power source 86. During freezing weather, the switch 88 is closed to supply electric current through the element 80 in order to supply heat to the mirror assembly to prevent freezing of the moving mirror assembly parts.

In operation of the mirror assembly during daytime driving, each time the left turn signal lever is actuated to indicate an impending left turn or change of driving lanes to the left, a flow of current is provided via the closed contacts 62 and 64 through the solenoid windings 26. Upon energization of the windings 26, the solenoid shaft 30 is pulled rearwardly to pivot the mirror 34 to the position 34'. The vision of the vehicle operator will thus be shifted to the left to provide clear rear vision in order to enable the making of a safe turn or change of driving lanes. A preferred arc of movement of the mirror 34 is about 10°. It will be noted that since the antiglare member 48 remains generally perpendicular to the line of traverse of the vehicle during daytime driving, the rear vision directly behind the vehicle is not entirely eliminated. However, this image will be very dim due to the generally transparent nature of the antiglare member 48.

In night driving, the vehicle light switch is closed, thereby closing the switch member 78 on contact 76. When the left turn signal switch 71 is actuated, current is provided via contacts 66 and 68 through the solenoid windings 28. The solenoid shaft 40 is then moved forwardly to position the antiglare member 48 in the position 48'. In preferred embodiment, it is desirable to shift the antiglare member about a 10° arc. The contact 64 is disengaged from the contact 62 and the contact 68 is disengaged from contact 66. Contact 66 is engaged with contact 70 to continue the application of electrical current through the solenoid windings 28. Current is prevented from passing through the solenoid windings 26 due to the opening of the contacts 62 and 64. The shifting of the antiglare member prevents the severe glare from headlights rearwardly of the vehicle from binding the vehicle operator.

Whereas the present invention has been described with respect to specific embodiments thereof, it will be understood that various changes and modifications will be suggested to one skilled in the art, and such changes and modifications are to be encompassed which fall in the true scope of the appended claims.

I claim:
1. A mirror assembly for a vehicle comprising:
   a. a mirror mounted for movement about a first vertical axis from a normal rear viewing position to a partially side viewing position;
   b. a generally transparent, partially reflective antiglare member mounted mounted forward of said mirror for independent movement about a second vertical axis between a first normal position and a second antiglare position,
   c. means having stop means for positioning said mirror relative to said first axis at either said rear viewing position or said side viewing position; and
   d. means including stop means for selectively moving said antiglare member between said first and second positions relative to said second axis so that reflected light rays reflected from said member are parallel to the rays reflected from said mirror in said first position and are at an angle to rays reflected from said mirror in said second position.

2. The mirror assembly of claim 1 wherein said first and second axis are spaced apart.

3. The mirror assembly of claim 1 wherein said first axis is defined at one end of said mirror and said second axis is defined on an opposite end of said antiglare member.

4. The mirror assembly of claim 1 and further comprising:
   a. first solenoid means for pulling said mirror rearwardly about said first axis when actuated; and
   b. second solenoid means pushing said antiglare member forwardly about said second axis when actuated.

5. The mirror assembly of claim 4 and further comprising circuit means for actuating said first solenoid in response to the position of the vehicle turn indicator and for actuating said second solenoid only when the vehicle lights are energized and said vehicle turn indicator is actuated.

6. The mirror assembly of claim 5 and further comprising contact means which are opened when said second solenoid is actuated to prevent said first solenoid from being actuated.

7. A vehicle mirror comprising:
   a. a support for attachment to the vehicle;
   b. a mirror mounted within said support for movement about a first vertical axis between a normal rear viewing position and a partially side viewing position;
   c. a partially reflective antiglare member mounted forward of said mirror for movement about a second vertical axis between a first normal position and a second antiglare position;
   d. a first electrically operable means having a shaft connected to said mirror and movable in response to the position of the direction signal lever of the vehicle for moving said mirror between said rear viewing position and said partially side viewing position;
   e. a second electrically operable means having a shaft connected to said antiglare member and responsive to the directional signal lever and to the vehicle light switch for moving said antiglare member between said first and second positions, so that reflected light rays reflected from said member are parallel to the rays reflected from said mirror in said first position and are at an angle to rays reflected from said mirror to said second position; and f. switch means for preventing said first means from being actuated when said second means is actuated.

8. The mirror assembly of claim 7 wherein said first and second means comprise first and second solenoids each having a solenoid shaft.

9. The mirror assembly of claim 8 wherein said first solenoid is operable to pull said mirror rearwardly about said first axis from a reference position generally perpendicular to the direction of movement of the vehicle to a second position when said directional signal lever is actuated, and further comprising spring means for returning said mirror to said reference position when said directional signal lever is released.

10. The mirror assembly of claim 8 wherein said second solenoid is operable to push said antiglare member forwardly about said second axis from a reference position generally perpendicular to the direction of movement of the vehicle to a second position when said directional signal lever and said vehicle light switch are actuated, and further comprising means for returning said antiglare member to said reference position when said directional signal lever is released.

11. The mirror assembly of claim 8 wherein said mirror is hinged to said support at one end and said antiglare member is hinged to said support at an opposite end.

12. The mirror assembly of claim 8 wherein said switch means comprises normally closed contact means connected to the solenoid shaft of said second solenoid which are opened when said second solenoid is actuated for preventing said first solenoid from being actuated.

13. The mirror assembly of claim 8 wherein said two extreme positions are angled to one another at about 10°.

14. The mirror assembly of claim 7 and further comprising selectively operable heating means disposed within said support.